Figure 1:
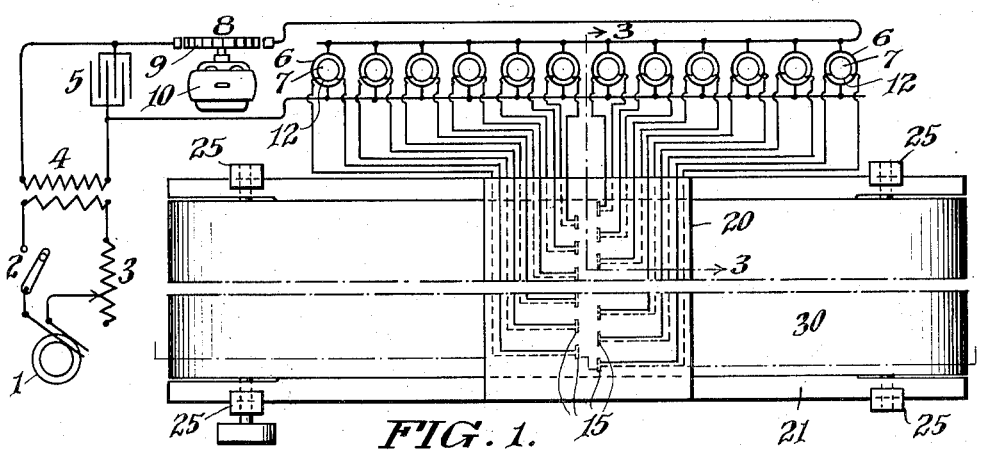

F. S. SMITH.
METHOD OF DESTROYING INSECTS.
APPLICATION FILED JAN. 7, 1911.

1,016,790.

Patented Feb. 6, 1912.

2 SHEETS—SHEET 1.

Witnesses
Daniel Webster, Jr.
Carrie E. Kleinfelder

Inventor
Franklin S. Smith
By Cyrus N. Anderson
Attorney

F. S. SMITH.
METHOD OF DESTROYING INSECTS.
APPLICATION FILED JAN. 7, 1911.
1,016,790. Patented Feb. 6, 1912.
2 SHEETS—SHEET 2.
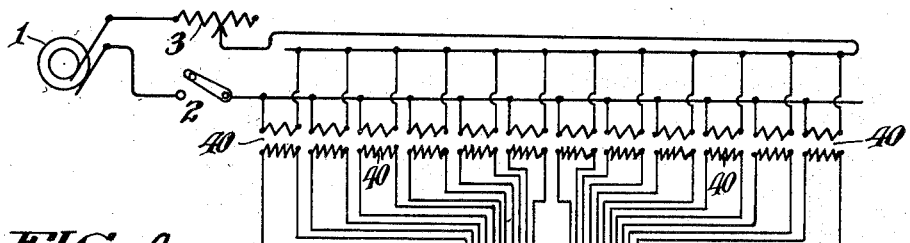
FIG. 4.
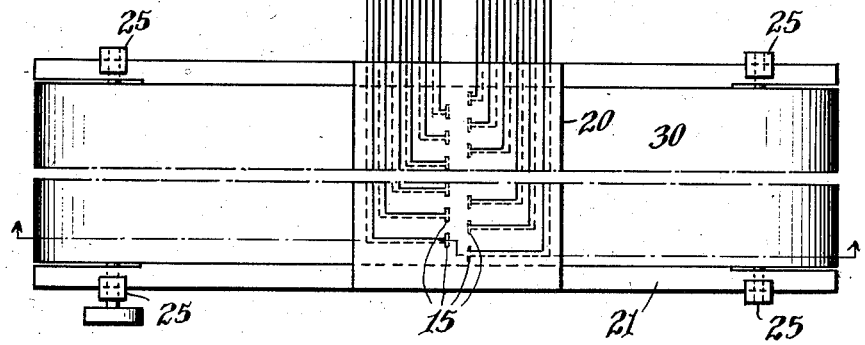
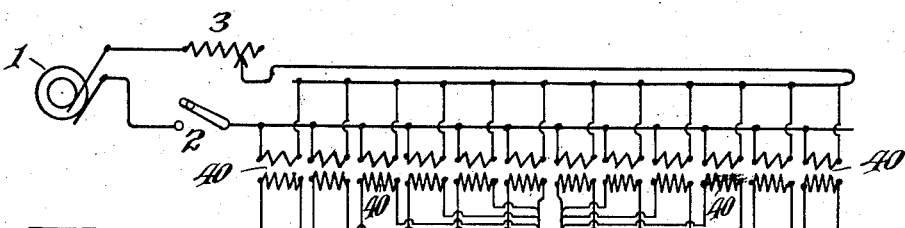
FIG. 5.
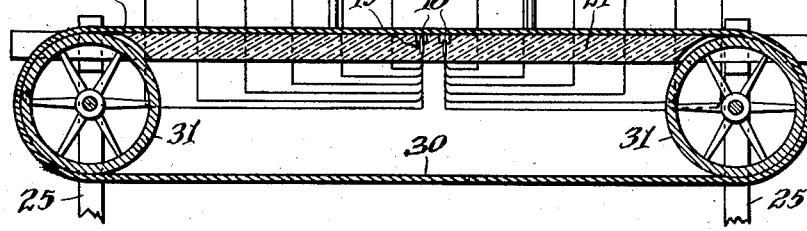
Witnesses
Daniel Webster Jr.
Carrie E. Kleinfelder.
Inventor
Franklin S. Smith
By Cyrus N. Anderson
Attorney

UNITED STATES PATENT OFFICE.

FRANKLIN S. SMITH, OF PHILADELPHIA, PENNSYLVANIA.

METHOD OF DESTROYING INSECTS.

1,016,790.  Specification of Letters Patent.  Patented Feb. 6, 1912.

Application filed January 7, 1911. Serial No. 601,282.

*To all whom it may concern:*

Be it known that I, FRANKLIN S. SMITH, a citizen of the United States, residing in the city and county of Philadelphia, State of Pennsylvania, have invented a certain new and useful Method of Destroying Insects, of which the following is a specification.

My invention relates to a method of destroying insects and their eggs, larvæ or pupæ, particularly those which infest and which are destructive of various articles of merchandise found in the industrial arts.

Without attempting to enumerate all of the various articles and objects which may be treated according to my invention for the purpose of destroying the destructive insects which may infest and may destroy them, I may mention food products, such as cereals, prepared breakfast foods of the various kinds, dried fruits, flour, figs, etc.; tobacco, either in the leaf state or after it has been converted into some form of manufactured product, such as cigars or cigarettes; wearing apparel, such as furs, woolens, etc.; and books, papers, etc.

It is known to almost every one that all of the various articles named are liable to be and frequently are injured by various insects, worms, etc. which may attack them. Great quantities of clothing, food stuffs, such as cereals; tobacco; etc. are destroyed during the course of every year by the various insects etc. which are peculiar thereto.

It is known that insects which may attack and injure certain articles do not attack other objects of a different character. It is also known that there is a species of worm, more apt to be found in warmer countries, commonly called the book worm, which attacks books, papers, etc. and causes great injury and damage thereto. It may be stated that many species of the book worm are known.

The principle involved in my invention may be employed also for the purpose of destroying the various insects, their eggs, larvæ or pupæ which attack fruit and other trees and cause their blight and frequently their death.

It is to be understood that the employment of my new method is not limited to the articles and objects designated above but may be employed for the treatment of many other objects for the destruction of such insects, etc., as may infest them and cause injury, deterioration and frequently the destruction thereof.

My invention consists in the subjection of insects, their eggs, larvæ or pupæ, to the action of electrical discharges by which they are destroyed. In the actual practice and use of my method the article or articles infested with the insects, their eggs, larvæ or pupæ, would be subjected to the action of the electrical discharges in such manner as to cause the elimination and destruction of the said insects, etc., without injury to or in any way causing the deterioration of the quality or character of the said article or articles.

Care must be exercised in the practicing of my invention to prevent the formation of sparks in the electrical discharge of too great capacity. This is particularly true in cases where the article which is subjected to the action of the electrical discharge is readily oxidized and carbonized.

I may employ in my new method discharges caused either by oscillation or uni-directional currents. In the drawings I have illustrated means for producing oscillating currents but the manner in which the current in a machine, such as is shown, for instance, in Figures 4 and 5 of the drawings, may be converted from an oscillating into a uni-directional current is well known to those having knowledge of the electrical art.

In the carrying out and practicing of my invention, it is necessary generally that the objects and articles treated shall be free from metallic substances though there are some cases which form an exception to this rule.

The objects and articles to be treated should be placed within and subjected to the action of electrical discharges and if there should be present any metallic substance or substances they would act as isolated capacities and would cause a condensation of the electrical discharges which pass through the objects or articles and thus prevent contact of the current with certain portions of the object or article being treated adjacent to such metallic substances, with the result that such portions would be unaffected and unacted upon by the discharge through the article or object being treated and the insects, etc., present in such portions, would be left unharmed.

Cereals and breakfast foods generally may be treated in bulk or in the usual card board boxes in which they are sold but when treated in such boxes care should be taken to prevent the presence of metal upon said boxes. Also cigars and cigarettes may be treated in bulk or in the boxes in which they are sold or marketed. The difficulty, however, in treating cigars and cigarettes in boxes as suggested is that such boxes are usually provided with decoration which includes a greater or less amount of metallic substances which would interfere with the successful operation of my invention and discovery in the treatment thereof in boxes; hence, cigars and cigarettes preferably should be treated in bulk and before being placed in the boxes in which they are marketed.

In the treatment of clothing care must be exercised to prevent the presence of metallic buttons because if such buttons were present they would act as isolated capacities as already indicated and cause a condensation of the discharge at the points at which they are located so as to prevent the action of the discharge upon the portions of the material of the garment which are in proximity to and surround the said buttons, leaving the insects, etc. on such portion unharmed.

In the use of my invention in the treatment of articles such as are above suggested, care must be exercised to prevent their oxidation and carbonization by the discharge sparks which are of too great a capacity. The capacity of the sparks may be controlled in various ways and by experience it has been found that sparks may be produced and employed in the carrying out and practicing of my invention which are of sufficient capacity to destroy the insects, their eggs, larvæ or pupæ which may be upon the articles treated but which will not cause injury to the articles themselves.

In the large number of experiments which I have heretofore carried out in the development of my invention, I have discovered that when it is carefully and intelligently practiced and used all of the insects, in whatever stage of their development whether as eggs, larvæ, pupæ, or adults, which may infest or be present in or upon an article which is treated, will be destroyed.

As apparatus is necessary to the practicing and carrying out of my invention, I have illustrated diagrammatically a couple of forms of construction which may be employed but it will be understood that other forms of apparatus than those illustrated may be employed or used to practice the same.

Figure 2:
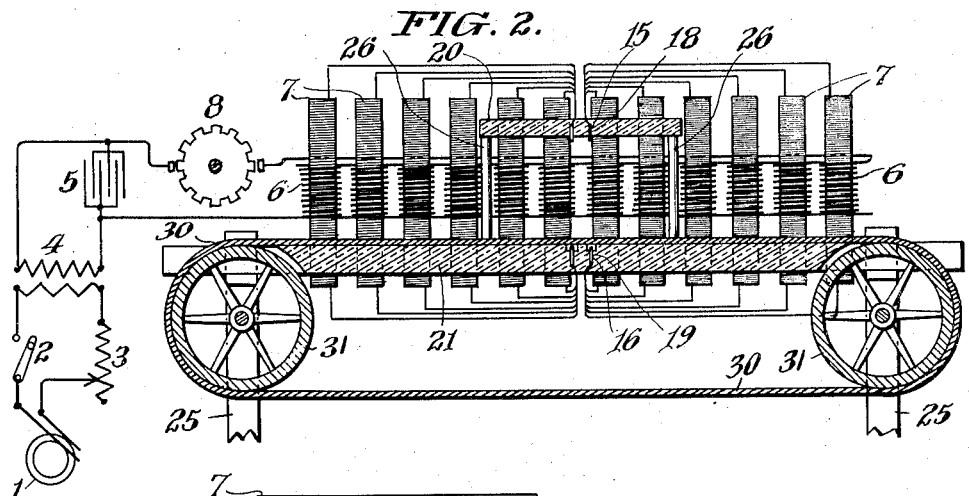
Figure 3:
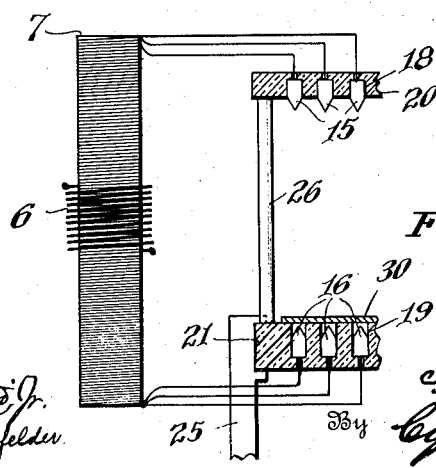

In the drawings:—Fig. 1 is a top plan view of an apparatus embodying my invention; Fig. 2 is a sectional side elevation of the same; Fig. 3 is an enlarged view on the line 3—3 of Fig. 1, showing more clearly a detail of construction; Fig. 4 is a top plan view of a modified construction of apparatus embodying my invention; and Fig. 5 is a sectional side elevation of the construction shown in Fig. 4.

Referring to the drawings:—The numeral 1 designates a source of alternating electric current; 2 a switch; and 3 a variable or adjustable resistance.

In Figs. 1 to 3 inclusive the resistance 3 is connected in series with the primary of a step-up transformer 4. The condenser 5 is connected in parallel with the secondary coil of the transformer 4. The primary coils 6 of the Tesla coils 7 are connected in multiple with the condenser 5, and the spark gap, of known construction, and designated as a whole by the reference numeral 8, is connected in series with the condenser 5 and the Tesla coils 7. The revoluble member 9 of the spark gap is rotated by means of a motor 10. The opposite ends of the secondary coils 12 of the Tesla coils are connected to oppositely disposed electrodes 15 and 16. These electrodes are arranged in two rows, as is indicated in Fig. 1 of the drawings, the electrodes in the two upper rows being arranged in staggered relation with respect to each other, as is clearly shown in Fig. 1 of the drawings, while those in the two lower rows are arranged in staggered relation with respect to each other in the same manner.

The number of Tesla coils and the number of electrodes and arrangement of the latter may be varied as desired.

Preferably, though in some cases it may be found to be unnecessary, the electrodes should respectively terminate in a single point in order that all portions of the object or article being treated, whether in boxes or otherwise, may be subjected to the action of the discharge. It has been found that if electrodes of considerable length and respectively provided with a plurality of points are employed and articles are treated in boxes, it happens that the discharge takes place between points of opposing electrodes which are nearest to alinement with a side of the said boxes along the said side so that the material in the boxes may not be acted upon. In such cases the insects or their eggs, larvæ or pupæ which may be present in the articles and which it is desired to destroy remain unaffected. The electrodes are supported in depressions or seats 18 and 19 formed in the plates 20 and 21 of insulating material, such as glass or porcelain.

It will be understood that when the switch 2 is closed an electric discharge takes place between the electrodes 15 and 16 such discharge, consisting of well defined sparks and also of what is known as effluve, both of which are visibly apparent. The plates 20 and 21 of insulating material are supported in any suitable manner, as for instance, upon posts or standards 25 and 26.

It will be observed that the electrodes 15 project a short distance below the lower side or surface of the plate 20 while the ends of the electrodes 16 are located a short distance below the upper side of the plate 21.

30 designates a conveyer of suitable non-conducting material supported upon revoluble wheels 31 driven from any suitable source of power, by means of which articles to be treated are conveyed into and across the space between the electrodes 15 and 16. The electrodes in the respective rows should be arranged close together and those in the respective plates upon which they are supported should be in staggered relation with respect to each other, as indicated in Fig. 1.

It is desirable that the electrodes should be arranged closely together and in staggered relation, as illustrated, in order that as an article is passed between the electrodes upon the conveyer 30 or by any other means supported intermediate the electrodes, all parts thereof should be subjected to the action of the discharge. In other words, there should be no wide gaps in the line or curtain of discharge through which an article or portions of an article might be passed without being acted upon thereby.

In Figs. 4 and 5 the variable or adjustable resistance 3 is connected in series with the primary coils of a number of step-up transformers 40 which are connected in multiple with the source 1 of current. The opposite ends of the secondary coils of the said transformers 40 are connected with the electrodes 15 and 16 supported and arranged in seats 18 and 19 formed in the insulating plates 20 and 21 in the same manner as is indicated in Figs. 1 to 3. The said insulating plates are supported upon posts or standards 25 and 26 in the same manner as the corresponding plates in Figs. 1 to 3 and the articles and objects are conveyed into and supported in position to be treated by means of a conveyer of insulating material 30 supported on revoluble wheels 31 driven from any suitable source of power (not shown).

It may be noted that the construction illustrated in Figs. 1 to 3 produces high frequency electrical oscillations mounting into the thousands per second, while that shown in Figs. 4 and 5 produces low frequency electrical oscillations of commercial or slightly higher frequency.

In both forms of construction as illustrated, the discharges are produced by means of electrical oscillations but it will be understood that the same result may be effected by the employment of discharges produced by a uni-directional current.

The manner of rectifying the current produced by an apparatus such as is shown in Figs. 4 and 5 so as to produce a uni-directional current is well known and need not be described herein.

In order to operate the apparatus illustrated in Figs. 1 to 3 of the drawings, the switch 2 should be closed and the motor 9 started. The variable or adjustable resistance 3 should then be so adjusted that there is no arcing of the current at the spark gap 8. The capacity of the sparks between the electrodes may be varied by varying the capacity of the condenser and also to some extent by adjusting the resistance 3.

In order to operate the apparatus illustrated in Figs. 4 and 5 the switch 2 should be closed and the variable or adjustable resistance 3 adjusted as desired. In this form of construction the capacity of the discharge spark may be controlled to some extent by adjusting the resistance 3 but it is principally dependent upon the transformers 40.

It may be noted here that to secure the best results the distance between the electrodes 15 and the surface of the top portion of the conveyer or other supporting means should be only slightly greater than the height or thickness of the objects or articles which are being treated in the apparatus.

As the articles being treated are placed in position in the space between the electrodes they are acted upon by the electrical discharge which takes place between the said electrodes, the passage of which through the objects effects or causes the destruction and killing of the insects, their eggs, larvæ or pupæ which may be present.

In the treatment of tobacco, whether it be in the form of cigars or in bundles or bales prior to being converted into a manufactured product or in any other form, the leaves thereof should be placed in the machine or apparatus so that they extend substantially in parallel relation with the direction of the lines of discharge of the electric sparks between the opposing electrodes. If cigars, for instance, are being treated, they should be supported with their ends upon the conveying belt or other means by which they are sustained in position between the electrodes for treatment. By so arranging the tobacco the current acts upon all parts of the leaves which may be included within a package and within each cigar (if the tobacco is in the form of cigars) and thus effectively destroys all of the insects, their eggs, larvæ or pupæ, as the case may be; whereas, if the tobacco is so placed that the sparks extend transversely of the leaves they are apt to pass directly therethrough without spreading over their surfaces and consequently are not likely to destroy all of the insects, etc. It is also the case that if the discharge sparks take place transversely of the leaves of the tobacco, it is likely that the latter would be carbonized.

In the treatment of tobacco, whatever the form of apparatus, discharges of small capacity should be employed or used so as to obviate any possibility of oxidizing and carbonizing or otherwise injuring the same; but in the treatment of other substances less easily carbonized, such as cereals, the capacity of the discharges employed or used may be increased without danger of causing oxidation and carbonization.

It is also necessary that the voltage of the apparatus employed should be adjusted or varied to correspond with the capacity or conductivity of the article being treated. For instance, the voltage used in treating a column of tobacco of a certain definite height should be less than that employed in the treatment of a column of the same height of some other substance, for instance, a cereal, of less conductivity.

In the employment of my invention in the treatment of tobacco, I have discovered that the combined length of the sparks between the opposing electrodes should be equal to one-third of the distance across the space between the same, because when the tobacco is placed in position for treatment it acts as a conductor so that the sparks will then extend along the tobacco clear across the space. But in the treatment of other substances of less conductivity and less capacity than tobacco, it is necessary that a voltage be employed which will occasion the production of sparks of greater length than is necessary when tobacco is being treated in order that when such substances are placed in position to be treated the sparks will extend entirely across the space occupied thereby. When treating cereals, for instance, the sparks should extend substantially entirely across the space between the electrodes before the cereals are placed in position to be treated. It must be understood, however, that my invention is not limited to the exact length of sparks above indicated but that their lengths may be considerably varied without departing from my invention.

The practicing of my invention is more satisfactorily and successfully carried out when the insects, their eggs, larvæ or pupæ or articles on or in which they are located are subjected to the action of electrical discharges which cover or extend across a considerable area so that every part of the article and every insect, etc. which is passed through the field of the discharge is acted upon thereby. I have discovered that the said insects, their eggs, larvæ or pupæ, are killed or destroyed immediately by the discharge sparks and I have discovered also that the said sparks seek out the said insects, eggs, larvæ or pupæ, wherever they may be in or upon the article and destroy them.

In its broadest aspect my invention may be regarded as comprehending the method of destroying insects, their eggs, larvæ or pupæ, by the action of electrical discharges thereon; and in its practical operation it is employed for the purpose of destroying such insects, their eggs, larvæ or pupæ, as may infest and cause injury to and deterioration of the various articles of commerce and other objects hereinbefore suggested and indicated.

Having thus described my invention, I claim:—

1. The method of treating articles and objects for the purpose of destroying the insects, their eggs, larvæ or pupæ which may infest the same, which consists in the production of a plurality of independent electric discharges between different points and thereby forming a field of electric discharges and in subjecting the articles or objects to the said discharges, whereby the insects, their eggs, larvæ or pupæ are subjected to the action thereof and thereby destroyed.

2. The method of treating tobacco for the purpose of destroying the insects, their eggs, larvæ or pupæ, which may infest the same, which consists in the production of an electrical discharge and subjecting the tobacco to the action of said discharge with the planes of its leaves or portions of leaves in the same general direction as that in which the discharge takes place to destroy such insects, their eggs, larvæ or pupæ.

3. The method of treating tobacco for the purpose of destroying the insects, their eggs, larvæ or pupæ, which may infest the same, which consists in the arrangement of the tobacco with the planes of its leaves or portions of leaves in substantially parallel relation with the lines of discharge produced by an alternating electric current and placing the said tobacco so arranged within the region of the said discharge, whereby the said insects, their eggs, larvæ or pupæ are destroyed.

4. The method of treating tobacco for the purpose of destroying the insects, their eggs, larvæ or pupæ, which may infest the same, which consists in the production of an electric discharge, in adjusting the energy of the sparks of the discharge to the conductivity of the tobacco and subjecting the tobacco to the action of the said discharge with the planes of its leaves or portions of its leaves extending in the same general direction as that of the sparks of the discharge, whereby such insects, their eggs, larvæ or pupæ are destroyed.

In testimony that I claim the foregoing as my invention, I have hereunto signed my name this 4th day of January, A. D. 1911.

FRANKLIN S. SMITH.

In the presence of—
GEO. H. WEIDNER,
CARRIE E. KLEINFELDER.